United States Patent
An et al.

(10) Patent No.: US 12,544,263 B2
(45) Date of Patent: Feb. 10, 2026

(54) PUPIL-AWARE EYE TRACKING FOR EYE SAFETY

(71) Applicant: Meta Platforms Technologies, LLC, Menlo Park, CA (US)

(72) Inventors: Yatong An, Redmond, WA (US); Youmin Wang, Bellevue, WA (US); Gaetano Aiello, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 422 days.

(21) Appl. No.: 18/107,344

(22) Filed: Feb. 8, 2023

(65) Prior Publication Data
US 2024/0261147 A1 Aug. 8, 2024

(51) Int. Cl.
*A61F 9/008* (2006.01)
*A61B 3/11* (2006.01)

(52) U.S. Cl.
CPC .......... *A61F 9/00804* (2013.01); *A61B 3/112* (2013.01); *A61F 2009/00846* (2013.01); *A61F 2009/00865* (2013.01); *A61F 2009/00897* (2013.01)

(58) Field of Classification Search
CPC ........ A61F 9/00804; A61F 2009/00846; A61F 2009/00865; A61F 2009/00897; A61B 3/112
USPC ....................................................... 351/210
See application file for complete search history.

(56) References Cited

U.S. PATENT DOCUMENTS

| 7,922,330 | B2* | 4/2011 | Van Saarloos | A61B 3/113 351/210 |
| 9,788,714 | B2 | 10/2017 | Krueger | |
| 10,761,602 | B1 | 9/2020 | Sharma et al. | |
| 2012/0050681 | A1* | 3/2012 | Bonnin | A61B 3/113 351/210 |
| 2013/0114850 | A1* | 5/2013 | Publicover | A61B 3/0025 382/103 |
| 2015/0277123 | A1* | 10/2015 | Chaum | G09G 3/02 348/62 |
| 2020/0368616 | A1 | 11/2020 | Delamont | |
| 2021/0318558 | A1 | 10/2021 | Tzvieli et al. | |
| 2021/0325963 | A1* | 10/2021 | Hudman | G02B 27/0172 |

OTHER PUBLICATIONS

Fan C-P., "Chapter 12, Design and Implementation of a Wearable Gaze Tracking Device with Near-Infrared and Visible Light Image Sensors," Advances in Modern Sensors, Nov. 2020, 14 pages.

* cited by examiner

*Primary Examiner* — Sharrief I Broome
(74) *Attorney, Agent, or Firm* — Greenberg Traurig, LLP

(57) ABSTRACT

Eye safety and eye tracking accuracy is enhanced through pupil-aware eye tracking, where a fringe pattern projection or illumination onto the eye is locally dimmed in an area corresponding to the pupil. Fringe projection local dimming is accomplished by modifying (locally dimming) the fringe pattern at the projector. Illumination local dimming is accomplished at the light source (e.g., a laser source) before the light is provided by a micro-electromechanical system (MEMS) to the eye. An amount of light provided to non-pupil areas such as sclera may be increased to enhance a signal-to-noise ratio (SNR), which may lead to more accurate eye tracking.

20 Claims, 8 Drawing Sheets

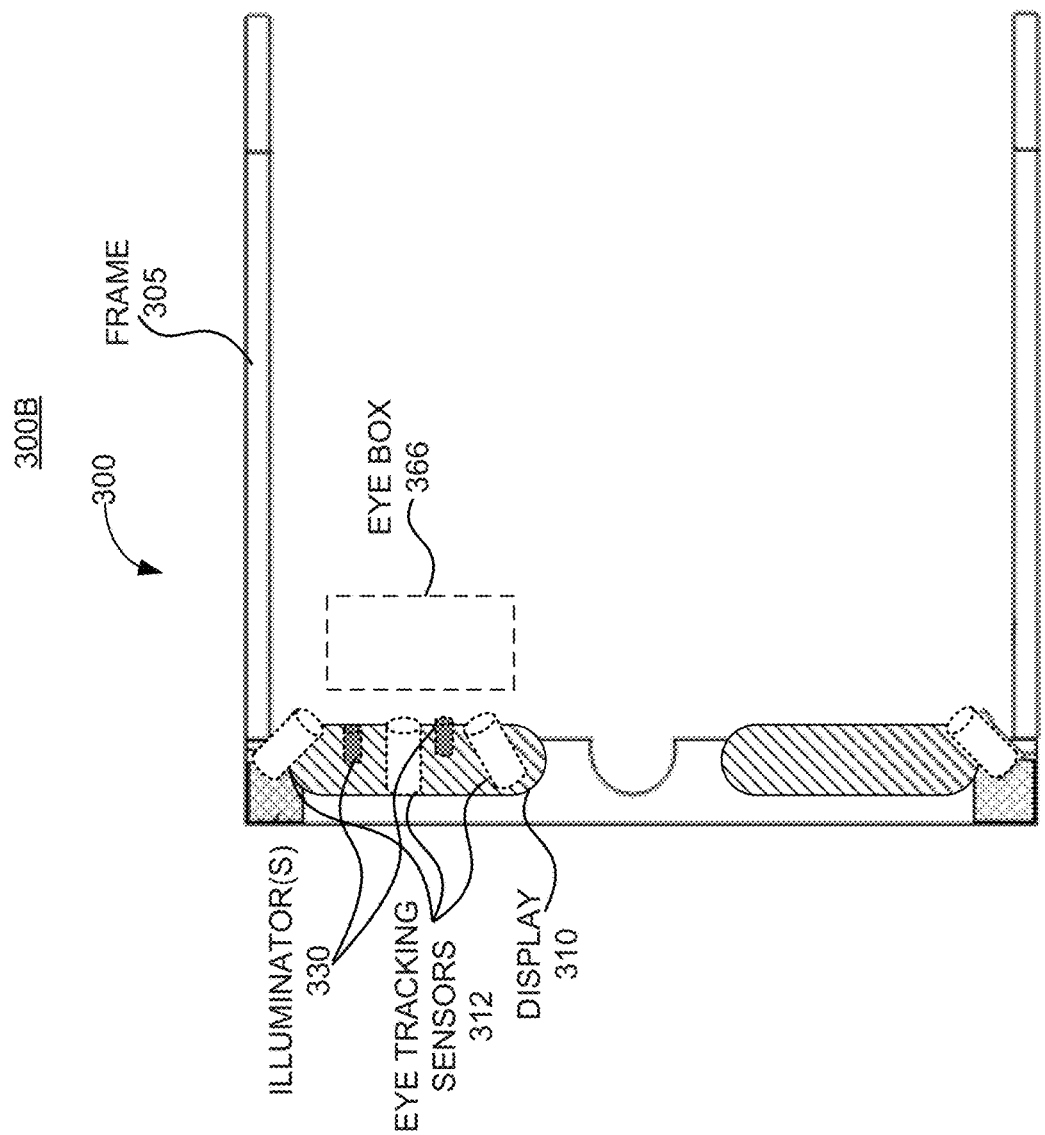

PUPIL-AWARE EYE TRACKING FOR EYE SAFETY

TECHNICAL FIELD

This patent application relates generally to eye tracking in near-eye display devices, and in particular, protection of the eye through pupil-aware eye tracking by locally dimming portion(s) of projection or illumination corresponding to the pupil.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 3A and 3B illustrate a perspective view and a top view of a near-eye display in the form of a pair of glasses, according to an example.

DETAILED DESCRIPTION

Figure 1:
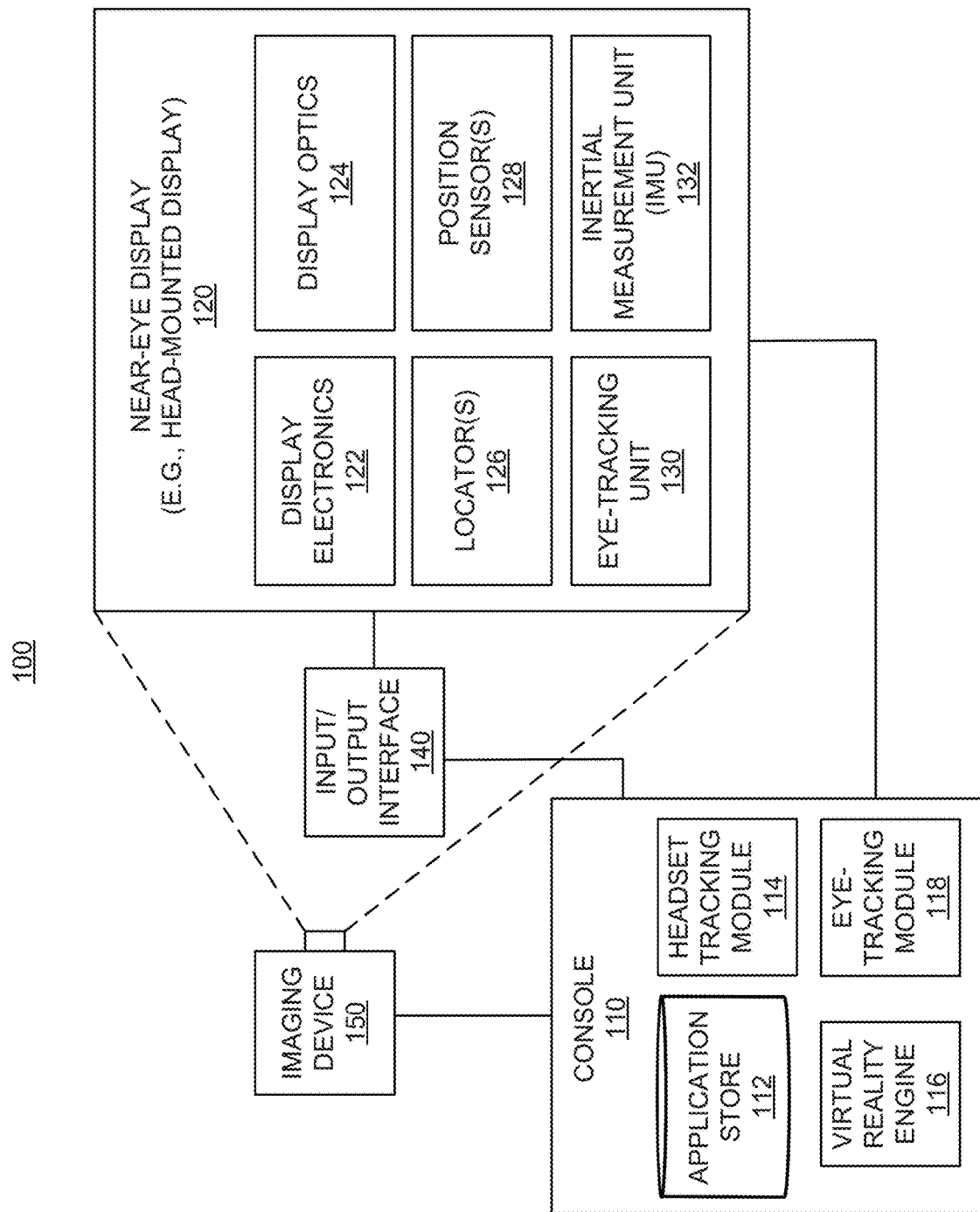
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Tracking a position and orientation of the eye as well as gaze direction in head-mounted display (HMD) devices may unlock display and rendering architectures that can substantially alleviate the power and computational requirements to render 3D environments. Furthermore, eye-tracking enabled gaze prediction and intent inference can enable intuitive and immersive user experiences adaptive to the user requirements in his/her interaction with the virtual environment.

Eye tracking may be achieved via a number of techniques. Fringe projection, which projects a periodical pattern onto the eye and uses the reflected pattern to determine three-dimensional (3D) features, is one technique. Another technique utilizes time-of-flight analysis of light projected onto the eye. These and similar techniques involve projection of light, for example, laser light onto the eye and capture of the reflection from the eye at a near distance. Eye safety is a core concern in virtual reality (VR)/augmented reality (AR) eye tracking applications. To ensure the user's safety, the illumination in the eye tracking sensors has strict requirements. Among potential eye safety issues, retina damage is a significant challenge to be taken into consideration when designing eye tracking sensors. Retina damage is mainly caused by light passing through the pupil. However, current eye tracking sensors usually project a uniformly distributed pattern onto the eye regardless the position of the pupil.

In some examples of the present disclosure, eye safety and eye tracking accuracy may be enhanced through pupil-aware eye tracking, where a fringe pattern projection or illumination onto the eye is locally dimmed in an area corresponding to the pupil. Fringe projection local dimming may be accomplished by modifying (locally dimming) the fringe pattern at the projector. Illumination local dimming may be accomplished at the light source (e.g., a laser source) before the light is provided by a micro-electromechanical system (MEMS) to the eye. In further examples, light provided to non-pupil areas such as sclera may be increased to enhance a signal-to-noise ratio (SNR), which may lead to more accurate eye tracking.

While some advantages and benefits of the present disclosure are apparent, other advantages and benefits may include reduction risk of damage to the eye by reducing an amount of light that may enter the eye through the pupil and improvement of eye tracking accuracy by increasing a signal-to-noise ratio (SNR) through increase of power of light to non-pupil areas.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). The fringe image may be projected onto the eye by a projector. A structured image may also be projected onto the eye by a micro-electromechanical system (MEMS) based scanner reflecting light (e.g., laser light) from a light source. In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
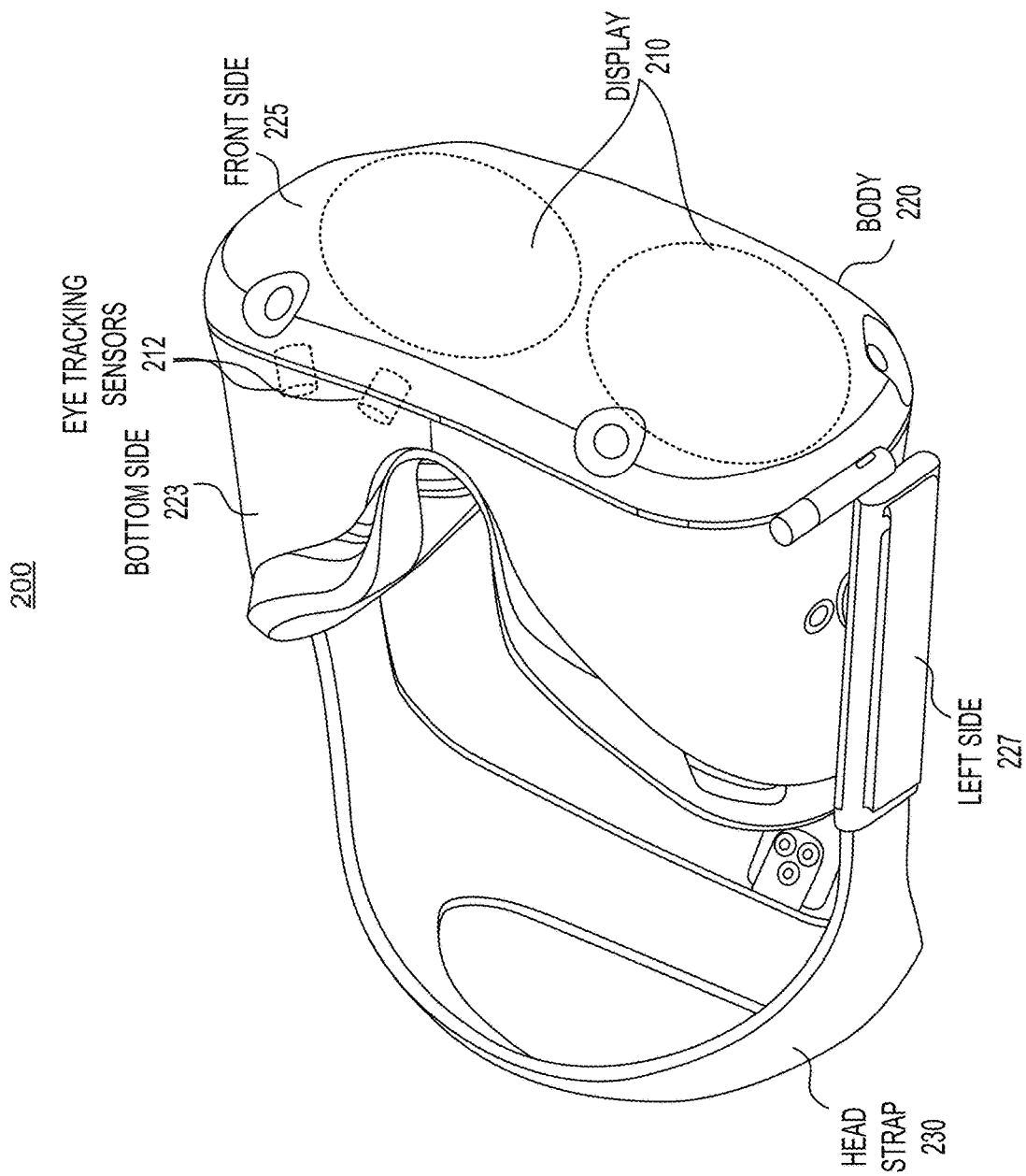
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide a structured light (e.g., a fringe pattern) onto the eye which may be captured by the eye tracking sensors 212. The eye tracking sensors 212 or a communicatively coupled processor (e.g., eye tracking module 118 in FIG. 1) may analyze the captured reflection of the fringe pattern and analyze to generate a phase map of the fringe pattern, which may provide depth information for the eye and its structures. In other examples, the projector may be a combination of a laser source and a micro-electromechanical system (MEMS) based 2D scanner.

Figure 3A:
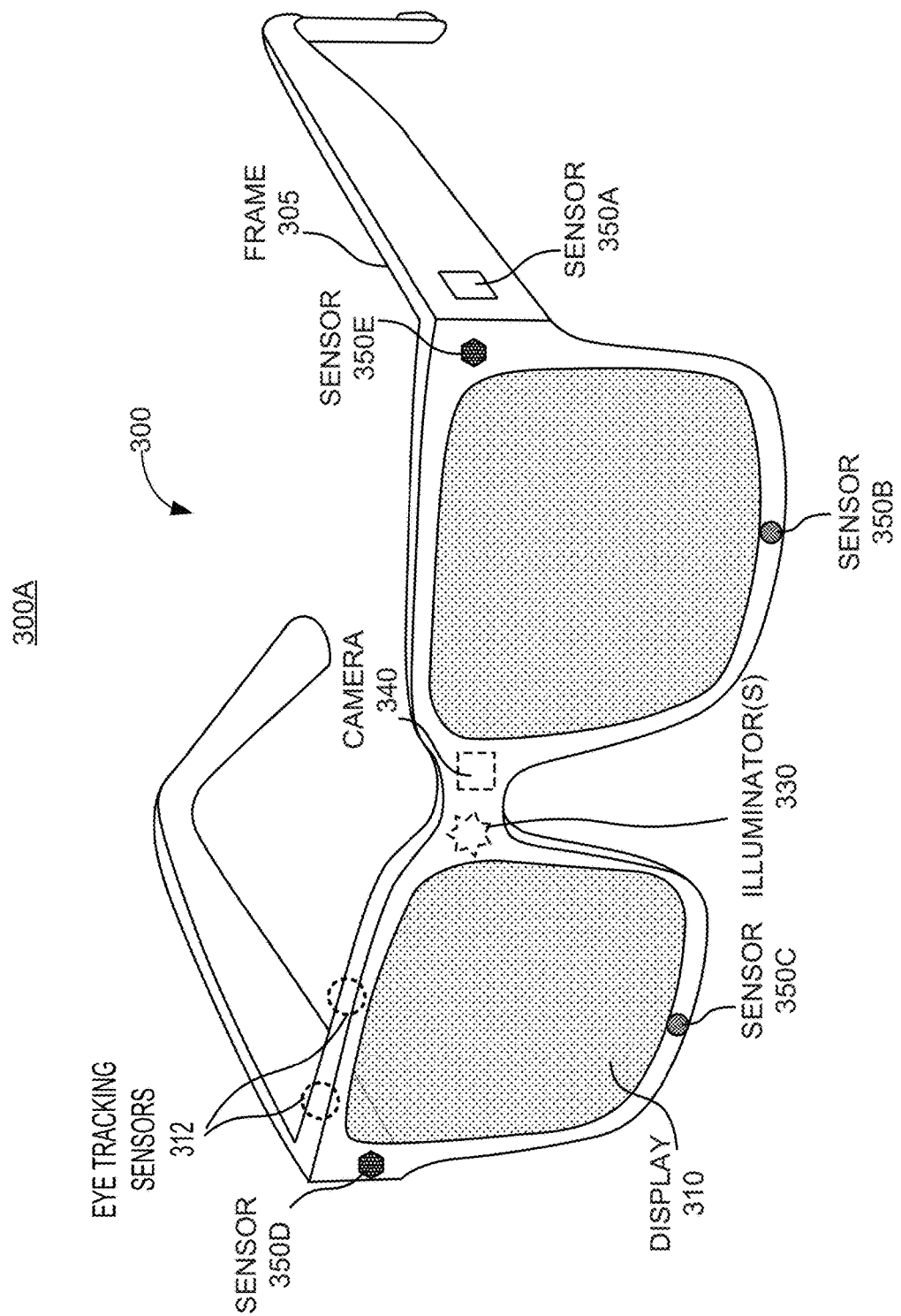

FIG. 3A is a perspective view 300A of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include eye tracking sensors 312.

FIG. 3B is a top view 300B of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a fringe projector 314 such as any fringe projector variant considered herein, a display 310 to present content to an eye box 366, eye tracking sensors 312, and one or more illuminators 330. The illuminators 330 may be used for illuminating an eye box 366, as well as, for providing glint illumination to the eye. A fringe projector 314 may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box 366.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking sensors 312 may be used to determine position and/or orientation of both eyes of the user. Once the position and orientation of the user's eyes are known, a gaze convergence distance and direction may be determined. In some examples, the eye tracking sensors 312 may be single photon avalanche diode (SPAD) sensors. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators 330 may illuminate the eyes at the corresponding eye boxes 366, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 366.

In some examples, the image processing and eye position/orientation determination functions may be performed by a central controller, not shown, of the near-eye display 300. The central controller may also provide control signals to the display 310 to generate the images to be displayed to the user, depending on the determined eye positions, eye orientations, gaze directions, eyes vergence, etc.

Figure 4:
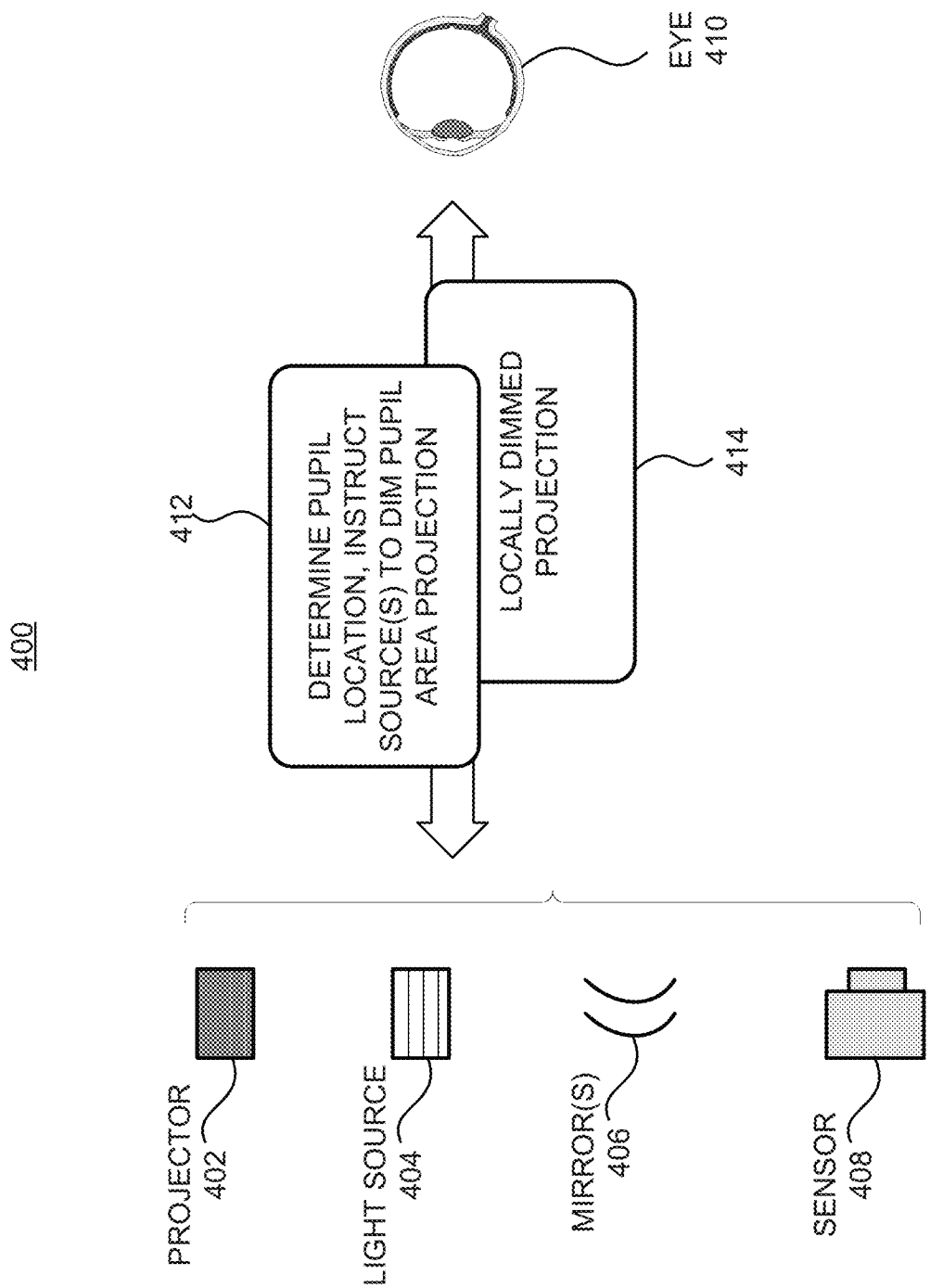
FIG. 4 illustrates a diagram of pupil-aware eye tracking by locally dimming portion(s) of projection or illumination corresponding to the pupil, according to examples.

FIG. 4 illustrates a diagram of pupil-aware eye tracking by locally dimming portion(s) of projection or illumination corresponding to the pupil, according to examples. Diagram 400 shows a projector 402, a light source 404 and mirror(s) 406 to illuminate an eye 410, and a sensor 408. Protection of the eye through local dimming may be accomplished by determining pupil location and instructing the sources (projector 402 or light source 404 and mirror(s) 406) to dim a portion of the projection corresponding to the pupil (412). The locally dimmed projection may be provided (414) onto the eye 410.

Among potential eye safety challenges in virtual reality (VR)/augmented reality (AR) near-eye display applications, retina damage is a substantial issue to be taken into consideration when designing eye tracking sensors. Retina damage may be caused by light (e.g., laser light from an eye tracking light source) passing through the pupil. Conventional eye tracking systems typically project a uniformly distributed pattern onto the eye regardless of the position of the pupil.

One category of eye tracking systems may utilize the projector 402 to project a fringe pattern (a periodical structured pattern) onto the eye surface and uses a reflected pattern to determine 3D features of the eye's surface to track a gaze of the user. When a phase of the fringe pattern is constrained to a particular interval, the phase of the fringe pattern is called a wrapped phase. Otherwise, the phase is called an unwrapped phase. To determine depth information and remove discontinuities, the phase of the captured fringe pattern may be unwrapped for example through spatial phase unwrapping. Using an arbitrary starting point on the fringe pattern, some spatial phase unwrapping techniques may detect the discontinuities by analyzing the neighboring pixels to generate a relative unwrapped phase map, where the unwrapped phase map is relative to the starting point. In some examples, upon determination of a location of the pupil, the projector may be arranged to darken a portion of the projected pattern corresponding to the location of the pupil. Thus, entry of light into the eye through the pupil (from the projector 402) may be prevented along with reduction of risk of damage to the retina.

Another category of eye tracking systems may utilize a micro-electromechanical system (MEMS) based scanner. Light (e.g., laser light) from a light source 404 may be reflected through mirror(s) 406 onto the eye in a 2D scan motion, thereby generating a planar pattern (with the laser light being turned on and off to create a pattern). In some examples, the light source 404 may be a side-emitting laser diode, a vertical-cavity surface-emitting laser diode, a superluminescent light-emitting diode, or a light-emitting diode (LED). The light source 404 may also be infrared or near-infrared (NIR) to avoid distraction of the user. The micro-electro-mechanical system (MEMS) may oscillate the mirror(s) 406 in two dimensions creating the 2D scan pattern. The mirror(s) 406 may also be galvanometric mirrors. Upon determination of a location of the pupil, the light source 404 may be arranged to darken a portion of the projected pattern corresponding to the location of the pupil. Thus, entry of light into the eye through the pupil (from the mirror(s) 406) may be prevented along with reduction of risk of damage to the retina.

While the sensor 408 may be a camera (a high-speed camera for accuracy), it may also be implemented as a single photon avalanche diode (SPAD) or an array of single photon avalanche diodes (SPADs). Single photon avalanche diode (SPAD) sensors may achieve superfast measurement by increasing gain to decrease the integration time. Because of the high gain property, single photon avalanche diode (SPAD) sensors may be affected by the ambient light easily, leading to noise in the measurement. In some examples, narrow band single photon avalanche diode (SPAD) sensors may be used to address noise challenged in the feature matching process and achieve more accurate measurements. However, such sensors may not be able to capture high-resolution images of the entire eye surface. Thus, pupil steering using one or more of the light source 404, the mirror(s) 406, and the sensor 408 may be used to enhance the resolution of captured images and detect three-dimensional (3D) features of the eye.

In some examples, eye safety and eye tracking accuracy may be enhanced through pupil-aware eye tracking, where a fringe pattern projection or illumination onto the eye is locally dimmed in an area corresponding to the pupil. Fringe projection local dimming may be accomplished by modifying (locally dimming) the fringe pattern at the projector 402. Illumination local dimming may be accomplished at the light source 404 (e.g., a laser source) before the light is provided by the mirror(s) 406 of the micro-electromechanical system (MEMS) to the eye 410. In further examples, light provided to non-pupil areas such as sclera may be increased (while the pupil area is dimmed) to enhance a signal-to-noise ratio (SNR), which may lead to more accurate eye tracking.

Figure 5:
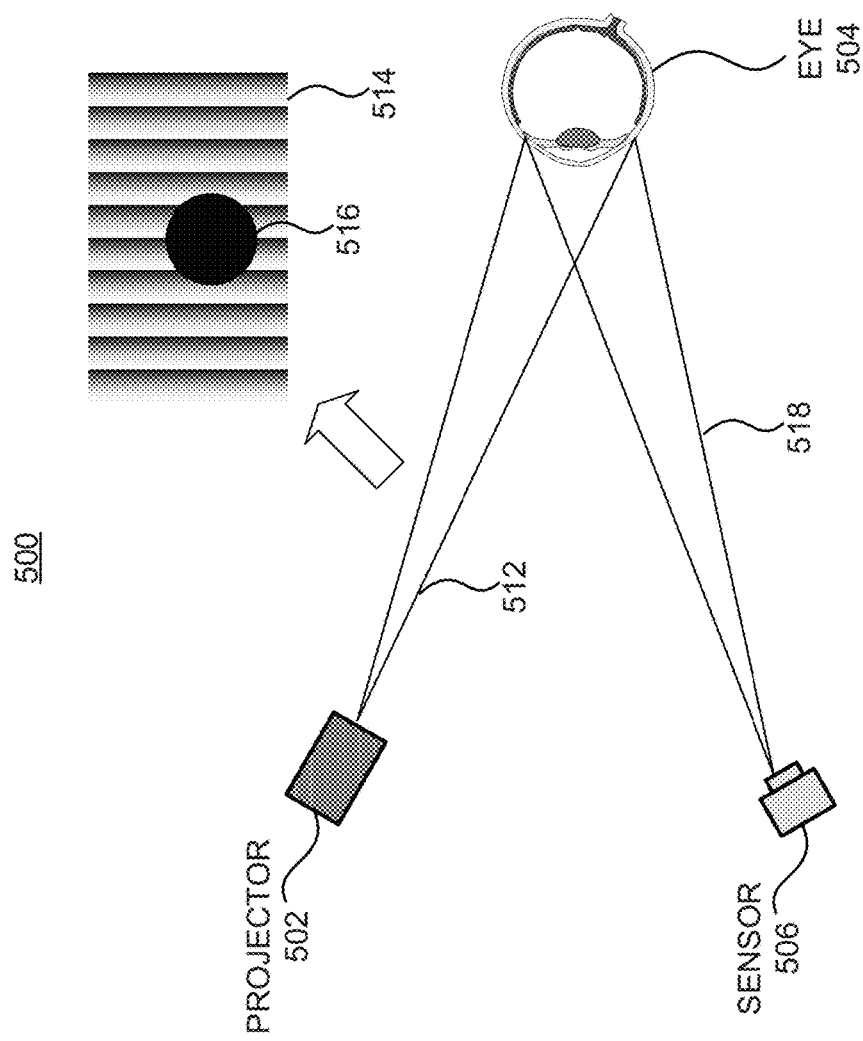
FIG. 5 illustrates a diagram of fringe projection local dimming to protect a pupil, according to an example.

FIG. 5 illustrates a diagram of fringe projection local dimming to protect a pupil, according to an example. Diagram 500 shows a projector 502 projecting (512) a fringe pattern 514 onto a surface of an eye 504, and a sensor 506 capturing (518) a reflection of the projected fringe pattern 514 from the eye 504. A portion 516 of the fringe pattern 514 corresponding to a location of the pupil may be dimmed (or darkened) to protect the eye 504.

In some examples, a controller (not shown) may receive the captured image of the reflected pattern and process to obtain 3D feature information. The controller may also be used to identify a location of the pupil and instruct the projector 502 to dim the portion 516 of the pattern corresponding to the location of the pupil. In some implementations, the dimming may be achieved by dimming pixels of the display of the projector within the portion 516. In other implementations, a pixel-controllable filter may be used to darken the portion of the pattern at the output of the projector 402. The controller may provide location of the pupil information to the projector 402 in feedback manner, that is, as the user's gaze (along with it the location and dimensions of the pupil) is detected and tracked, the eye tracking information may be used by the projector to determine the portion of the pattern to dim.

In some examples, a power of light provided by the projector to areas not corresponding to the pupil (e.g., sclera) may be increased to improve a signal-to-noise ratio (SNR) of the eye tracking signal. For example, an overall projector brightness may be increased while the portion corresponding to the pupil is dimmed or darkened. As mentioned herein, the sensor 506 may be a camera, a single photon avalanche diode (SPAD), an array of single photon avalanche diodes (SPADs), or similar image capture sensors.

Figure 6:
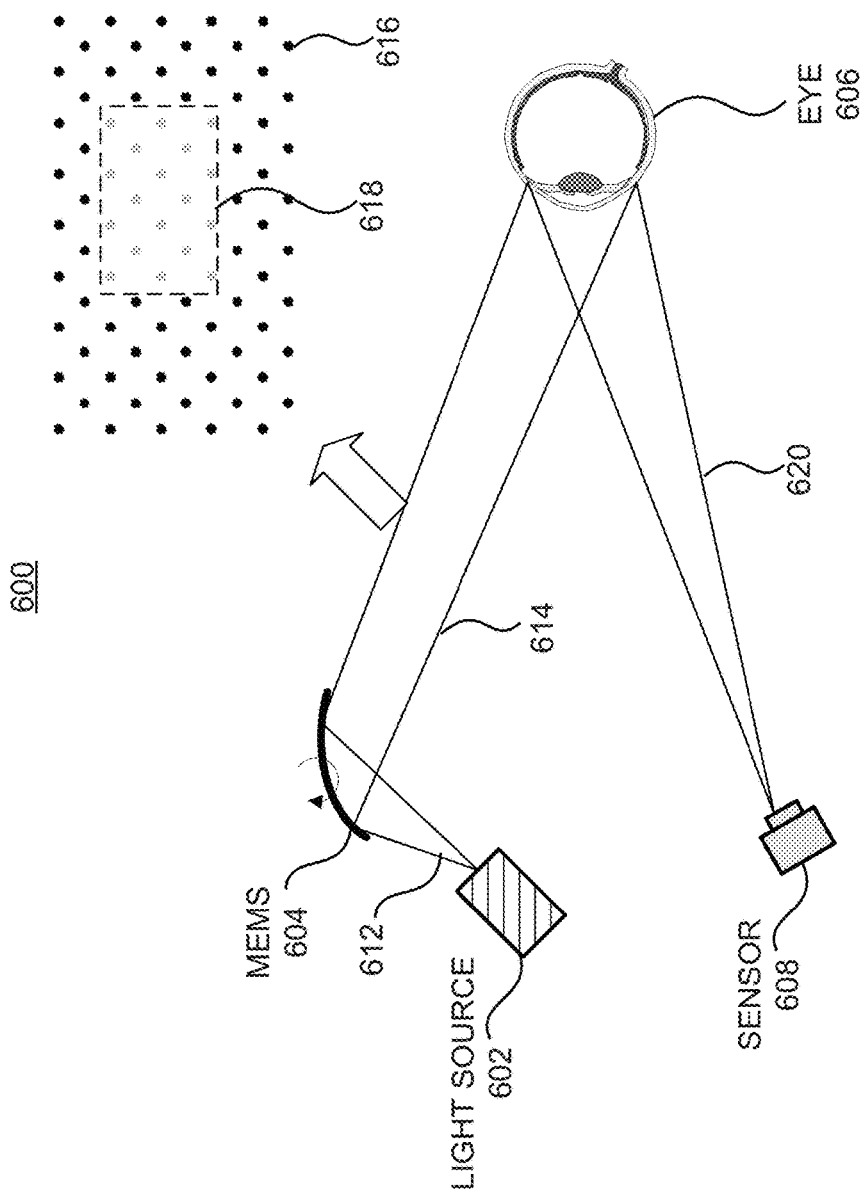
FIG. 6 illustrates a diagram of illumination local dimming to protect a pupil, according to an example.

FIG. 6 illustrates a diagram of illumination local dimming to protect a pupil, according to an example. Diagram 600 shows a light source 602 providing light (e.g., laser light) to a micro-electromechanical system (MEMS) device 604, which through a 2D scanning motion illuminates (614) a surface of an eye 606 creating a structured pattern 616 through turning on and off of the light source in coordination with the 2D scan. A reflection of the illumination from the eye 606 may be captured (620) by a sensor 608.

Similar to the fringe pattern projection in FIG. 5, the light source 602 (e.g., side-emitting laser diode, a vertical-cavity surface-emitting laser diode, a superluminescent light-emitting diode, or a light-emitting diode (LED)) may be controlled based on location (and dimension) information of the pupil and a portion 618 of the illumination 616 may be dimmed by turning off the light source 402 in coordination with the micro-electromechanical system (MEMS) device 604. Thus, laser light may be reduced or prevented from entering the eye through the pupil protecting the retina.

In some examples, the micro-electromechanical system (MEMS) device 604 may be arranged to illuminate a portion or an entire surface of the eye 606. The sensor 608 may be a camera, a single photon avalanche diode (SPAD), an array of single photon avalanche diodes (SPADs), or similar image capture sensors. In other examples, a power of light provided by the micro-electromechanical system (MEMS) device 604 to areas not corresponding to the pupil (e.g., sclera) may be increased to improve a signal-to-noise ratio (SNR) of the eye tracking signal. For example, a brightness of the light source may be increased while the portion corresponding to the pupil is dimmed or darkened.

Figure 7:
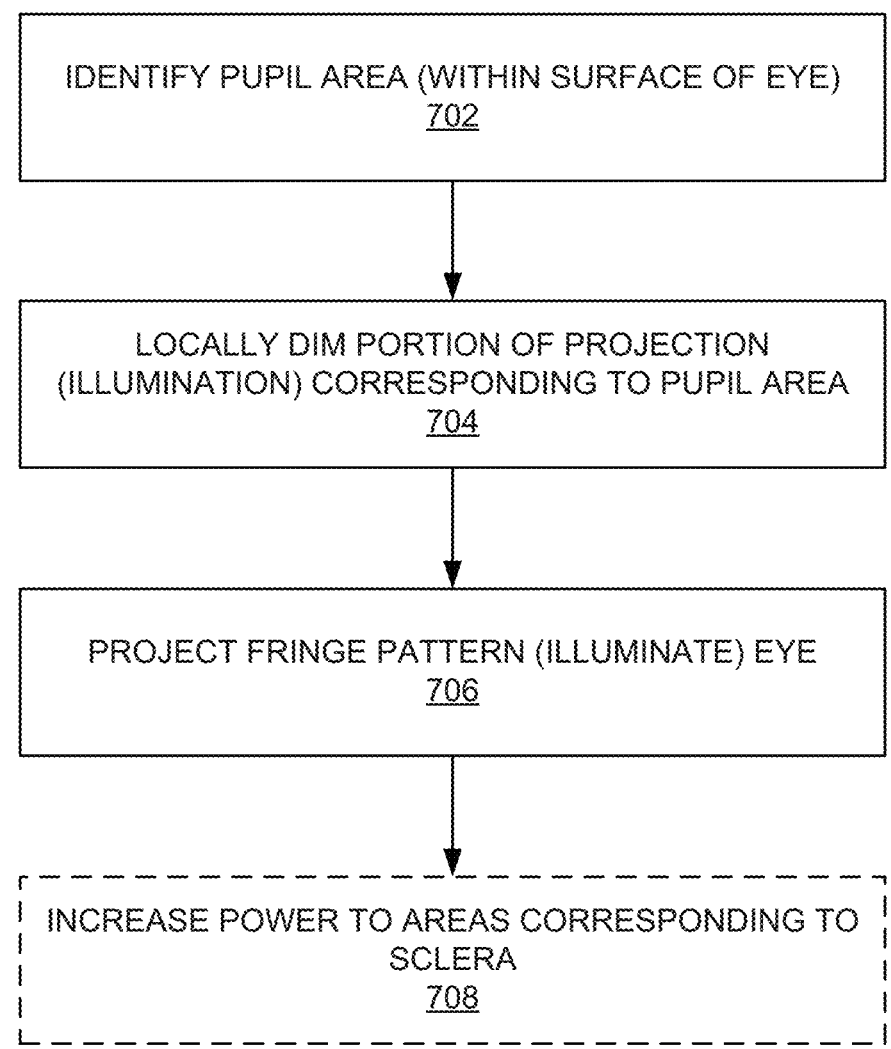
FIG. 7 illustrates a flow diagram for a method of protecting the eye through pupil-aware eye tracking by locally dimming portion(s) of projection or illumination corresponding to the pupil, according to some examples.

FIG. 7 illustrates a flow diagram for a method 700 of protecting the eye through pupil-aware eye tracking by locally dimming portion(s) of projection or illumination corresponding to the pupil, according to some examples. The method 700 is provided by way of example, as there may be a variety of ways to carry out the method described herein. Although the method 700 is primarily described as being performed by the components of FIGS. 5 and 6, the method 700 may be executed or otherwise performed by one or more processing components of another system or a combination of systems. Each block shown in FIG. 7 may further represent one or more processes, methods, or sub-routines, and one or more of the blocks (e.g., the selection process) may include machine readable instructions stored on a non-transitory computer readable medium and executed by a processor or other type of processing circuit to perform one or more operations described herein.

At block 702, a location (and dimensions) or a pupil relative to a surface of an eye may be identified. For example, the location of the pupil may be identified during a first pass of an eye tracking operation. In another examples, a separate pupil locating system (e.g., an infrared illuminator and sensor) may be used to locate the pupil.

At block 704, a portion of a fringe pattern projection (by a projector) or a structured pattern illumination (by a light source—MEMS combination) corresponding to the identified location of the pupil may be locally dimmed (or darkened). For example, pixels of the projector may be turned off or the light source in the light source—MEMS combination may be turned off temporally when the scanned illumination covers an area corresponding to the pupil.

At block 706, a portion of an entire surface of the eye may be illuminated with the structured illumination of projected with the fringe pattern with the portion corresponding to the pupil being locally dimmed. Thus, entry of light from the projector or illuminator into the eye through the pupil may be reduced or prevented.

At optional block 708, an amount of light (power) directed to non-pupil areas such as sclera may be increased. The increased light power may improve a signal-to-noise ratio (SNR) of the eye tracking signal, thereby, enhancing an accuracy of the eye tracking.

According to examples, a method of making a near-eye display device with eye protection through local dimming is described herein. A system of making the near-eye display device is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye tracking system, comprising:
   a projector to project a fringe pattern to a visible surface of an eye;
   a sensor to capture a reflection of the projected fringe pattern from the visible surface of the eye; and
   a controller communicatively coupled to the projector and the sensor, the controller to:
   receive at least one image of the captured reflection from the sensor;
   identify a location of a pupil of the eye; and
   instruct the projector to dim a portion of the projected fringe pattern corresponding to the location of the pupil.

2. The eye tracking system of claim 1, wherein the controller is further to:
   identify a dimension of the pupil; and
   select a size of the dimmed portion of the projected fringe pattern based on the identified dimension of the pupil.

3. The eye tracking system of claim 1, wherein the controller is to identify the location of the pupil during a first pass of an eye tracking operation.

4. The eye tracking system of claim 1, wherein the controller is further to:
   instruct the projector to increase a brightness of another portion of the projected fringe pattern corresponding to an area of the visible surface of the eye other than the pupil.

5. The eye tracking system of claim 4, wherein the area of the visible surface of the eye other than the pupil corresponds to a sclera.

6. The eye tracking system of claim 1, wherein the sensor comprises a camera or a single photon avalanche diode (SPAD) sensor.

7. An eye tracking system, comprising:
   an illuminator to project a structured illumination to a visible surface of an eye, wherein the illuminator comprises:
   a light source to provide light; and
   a micro-electro-mechanical system (MEMS) device to provide the illumination to the visible surface of the eye through a two-dimensional (2D) scan;
   a sensor to capture a reflection of the structured illumination from the visible surface of the eye; and
   a controller communicatively coupled to the illuminator and the sensor, the controller to:
   receive at least one image of the captured reflection from the sensor;
   identify a location of a pupil of the eye; and
   instruct the illuminator to dim a portion of the structured illumination corresponding to the location of the pupil.

8. The eye tracking system of claim 7, wherein the controller is further to:
   identify a dimension of the pupil; and
   select a size of the dimmed portion of the structured illumination based on the identified dimension of the pupil.

9. The eye tracking system of claim 7, wherein the controller is to identify the location of the pupil during a first pass of an eye tracking operation.

10. The eye tracking system of claim 7, wherein the micro-electro-mechanical system (MEMS) is to steer at least one mirror for the 2D scan.

11. The eye tracking system of claim 10, wherein the at least one mirror is a galvanometric mirror.

12. The eye tracking system of claim 7, wherein the light source comprises a side-emitting laser diode, a vertical-cavity surface-emitting laser (VCSEL) diode, a superluminescent light-emitting diode (SLED), or a light-emitting diode (LED).

13. The eye tracking system of claim 7, wherein the light source emits at least one of visible light, infrared light, or near-infrared (NIR) light.

14. The eye tracking system of claim 7, wherein the controller is further to:

instruct the light source to increase a brightness of another portion of the structured illumination corresponding to an area of the visible surface of the eye other than the pupil.

15. The eye tracking system of claim 14, wherein the area of the visible surface of the eye other than the pupil corresponds to a sclera.

16. A method, comprising:
identifying a location of a pupil on a visible surface of an eye;
generating a fringe pattern, wherein a portion of the fringe pattern corresponding to the location of the pupil is dimmed;
projecting the fringe pattern from a projector to the visible surface of the eye;
capturing a reflection of the projected fringe pattern from the visible surface of the eye; and
tracking a gaze of a user based on the captured reflection of the projected fringe pattern.

17. The method of claim 16, further comprising:
identifying a dimension of the pupil; and
selecting a size of the dimmed portion of the fringe pattern based on the identified dimension of the pupil.

18. The method of claim 16, further comprising:
increasing a brightness of another portion of the projected fringe pattern corresponding to an area of the visible surface of the eye other than the pupil.

19. The method of claim 16, further comprising:
generating a structured illumination, wherein a portion of the structured illumination corresponding to the location of the pupil is dimmed;
projecting the structured illumination from an illuminator comprising a light source and a micro-electro-mechanical system (MEMS) device to the visible surface of the eye;
capturing a reflection of the structured illumination from the visible surface of the eye; and
tracking a gaze of a user based on the captured reflection of the structured illumination.

20. The method of claim 19, further comprising:
increasing a brightness of another portion of the structured illumination corresponding to an area of the visible surface of the eye other than the pupil.

* * * * *